July 21, 1936.  A. T. SMITH  2,048,572
COOKING DEVICE
Filed Oct. 24, 1935

Inventor
Alva T. Smith
By Wilkinson, Huxley, Byron & Knight
Attorney

Patented July 21, 1936

2,048,572

UNITED STATES PATENT OFFICE 2,048,572

COOKING DEVICE

Alva T. Smith, Milwaukee, Wis., assignor to National Enameling and Stamping Company, Milwaukee, Wis., a corporation of New Jersey Application October 24, 1935, Serial No. 46,455

29 Claims. (Cl. 53—2)

The present invention relates to cooking devices.

Among the objects of the present invention is to provide an improved cooking device or utensil which is adapted to cook a plurality of foods or materials at the same time, and which is simple and sturdy in construction.

The present invention comprehends the idea of providing an improved cooking device having an inner receptacle disposed within an outer receptacle which may be removed therefrom alone or as a unit with the cover for the outer receptacle.

Another object within the purview of the present invention is to provide a novel cooker comprising an outer closed receptacle and a plurality of inner receptacles which are suitably spaced to permit the uninterrupted circulation of air, steam or other cooking medium More particularly, the present invention contemplates the idea of providing a plurality or nest of inner cooking pans or receptacles adapted to hold a plurality of different foods or material, and which are adapted to be inserted into and removed from the outer cooking well or receptacle as a unit, novel means being provided whereby this nest or group of receptacles may be moved as a unit with the cover into or withdrawn from the outer well or receptacle.

The invention also comprehends the idea of providing an improved construction for a plurality of inner receptacles wherein one or more of the receptacles may be detachably supported by one of them. More particularly, these receptacles are arranged in a novel manner whereby one or more receptacles are prevented from becoming displaced with respect to the other receptacle during movement of the nest or group of receptacles from place to place. In the embodiment illustrating the present invention, such displacement is prevented by engagement of these receptacles with the bails used in transporting or moving the group from place to place.

Still another object of the present invention is to provide these adjacent receptacles with one or more protuberances engageable with the next adjacent receptacle at substantially one or more points to space these receptacles apart to provide a substantially unobstructed passageway therebetween for free flow of a cooking medium to provide for a substantially uniform cooking of the material disposed therein.

Other objects, features, capabilities and advantages are comprehended by the invention, as will later appear and as are inherently possessed thereby.

Referring to the drawing.

Figure 1:
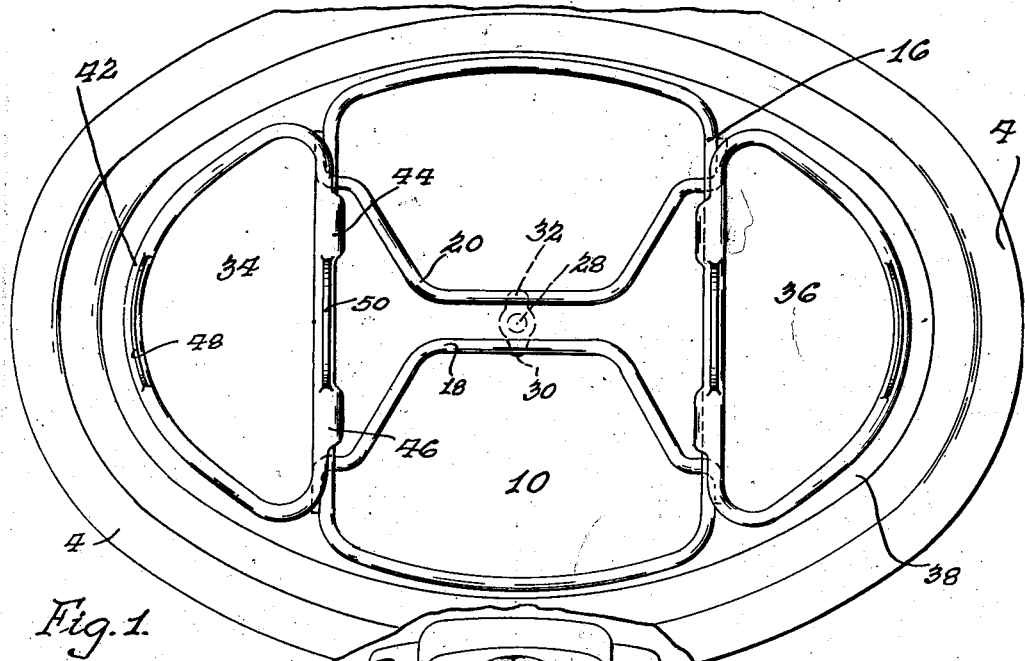
Figure 1 is a top plan view with the cover removed of a cooking device or utensil made in accordance with the present invention.

Referring now more in detail to the drawing, an embodiment selected to illustrate the present invention comprises an outer well or receptacle 2 formed with an upper laterally disposed flange 4 providing a support for the cover 6 which is formed with a handle 8 for removing the same when desired and to move or transport it from place to place. Disposed within the well or outer receptacle 2 is a nest or plurality of receptacles which in the embodiment disclosed includes a central receptacle 10 which is adapted to engage and be supported upon the bottom wall 12 of the outer well or receptacle 2. This receptacle 10 is provided with an upstanding wall 14 having a laterally disposed rolled edge 16 and below which openings are provided to hingedly secure bails 18 and 20 serving as means for moving the receptacle 10 from place to place. These bails are of substantially the shape disclosed in the drawing and may be moved so that their central portion is disposed substantially below a latch mechanism 22 rotatably secured to the cover 6. Exteriorly of the cover 6 and connected to the end of the latch mechanism 22 is a knob 24 which may be grasped to rotate the shank or depending stud 26 disposed interiorly of the cover and provided at its lower end with a latch member 28 having the wing portions 30 and 32.

Figure 2:
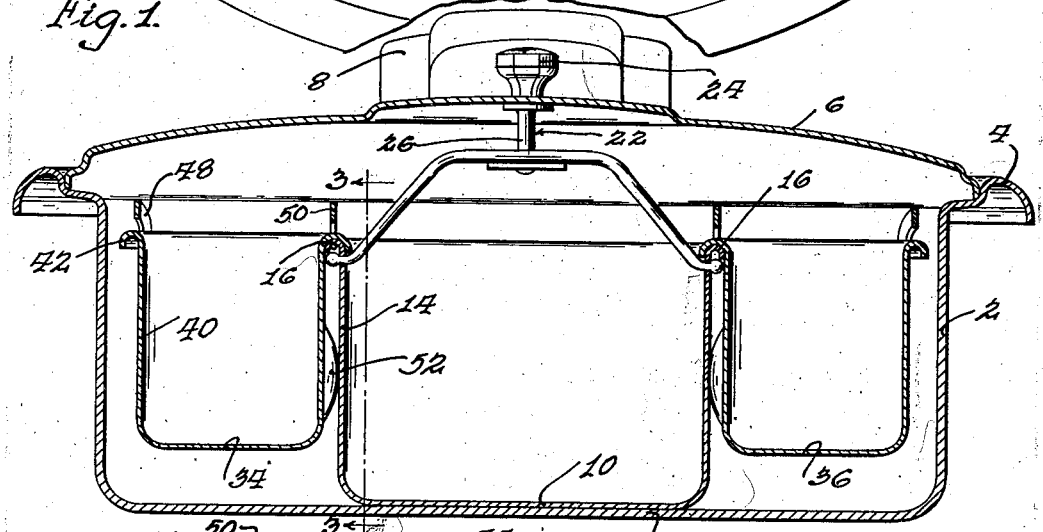
Figure 2 is a view in cross section taken in the plane at right angles to the disclosure in Figure 1 of the drawing.
Figure 3:
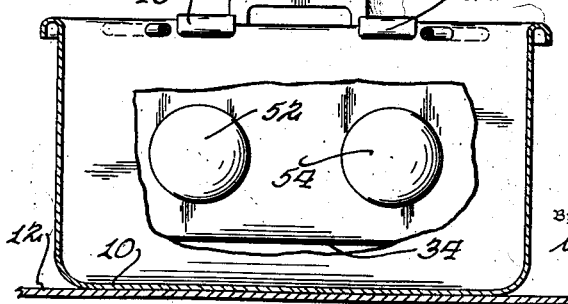
Figure 3 is a view in cross section taken in the plane represented by line 3—3 of Figure 2, with parts broken away to disclose the cooperative relation of the inner receptacles more in detail.

It will be apparent that when the cover 6 is in place as disclosed in Figure 2 of the drawing, the stud 26 with the latch member 28 secured thereto may be disposed between the central portions of the bail members 18 and 20. If it is desired to remove the cover alone, this may be effected by noting the position of the wing members 30 and 32 in respect to the bails 18 and 20, but if it is desired, for any reason, to remove the central receptacle 10 from the outer well 2, this may be done by rotating knob 24 to effect an engagement between the latch member 28 and the bails 18 and 20. When this interlocking relation exists between the cover and the receptacle, the cover and receptacle may be removed from the outer well as a unit. It is to be noted that when this is done the cover serves as a shield to protect the hands of the operator from becoming burned due to the escape of the cooking medium.

Although the present invention contemplates the use of but a single receptacle, such as 10, the present embodiment incorporates receptacles 34 and 36 disposed at the side of the receptacle 10, and as shown in Figure 1 of the drawing, receptacles 10, 34 and 36 are of such a configuration as to conform substantially to the interior contour of the outer wall 6, space being provided, however, as at 38 to provide for the substantially uninterrupted flow of the cooking medium.

Each of the laterally and adjacently disposed receptacles 34 and 36 is of a similar construction and is formed with an upstanding wall 40 provided with a rolled laterally disposed flange or edge 42, a portion thereof, as at 44 and 46, depending below the remaining portion thereof to provide suitable flanges overlapping the rolled edge 16 of the receptacle 10. These overlapped portions of the rolled edge 42 are disposed between the bails 18 and 20 and are adapted to be engaged thereby to prevent relative displacement or sliding movement of the receptacles 34 and 36 in respect to the receptacle 10. These receptacles 34 and 36 may also be formed with upstanding handles 48 and 50 whereby the same may be manipulated as desired.

Another improved feature of the present invention is embodied in receptacles 34 and 36, although it is to be understood that receptacle 10 may be provided with this improved feature without departing from the invention. As clearly shown in the present embodiment, receptacles 34 and 36 are formed with spaced protuberances 52 and 54 extending laterally of the face of wall 40 adjacent receptacle 10 to engage the upstanding wall 14 of this centrally disposed receptacle at substantially spaced points, thereby spacing the receptacles 34 and 36 in relation to receptacle 10 to provide for uninterrupted flow of a cooking medium between these receptacles to assure uniform cooking of the material therein. These protuberances 52 and 54 may be provided by causing a bulge in the upstanding wall 40 of the receptacles, or by the addition of material to the outer face thereof.

It is of course understood that when receptacles 34 and 36 are provided, the same may be removed from or inserted into the outer well by grasping bails 18 and 20 of receptacle 10, or this group of receptacles may be moved as desired as a unit with cover 6 when the knob is operated to effect an interlocking between the locking mechanism 22 and bails 18 and 20. It is also to be noted that the bottoms of the receptacles 34 and 36 are spaced from the bottom of the outer well 2 to assist in providing for the proper circulation of a cooking medium.

While I have herein described and upon the drawing shown an illustrative embodiment of the invention, it is to be understood that the invention is not limited thereto but may comprehend other constructions, arrangments of parts, details and features without departing from the spirit of the invention.

I claim:

1. A cooking device comprising inner and outer receptacles, a cover for said outer receptacle, means connected to said inner receptacle and adapted to be disposed above the top thereof for transporting the same from place to place, and means secured to said cover and operable from the exterior thereof for detachably connecting said cover to said first-named means whereby said inner receptacle and cover can be removed as a unit from said outer receptacle.

2. A cooking device comprising inner and outer receptacles, a cover for said outer receptacle, means including a hinged bail for transporting said inner receptacle from place to place, and means secured to said cover detachably connected to said bail whereby said inner receptacle can be removed from said outer receptacle upon removal of said cover from said outer receptacle, said means including a latch mechanism engageable with said bail depending from the interior of said cover and a rotatable knob exteriorly of said cover for operating said mechanism.

3. A cooking device comprising inner and outer receptacles, a cover for said outer receptacle, means including a pair of bails for transporting said inner receptacle from place to place, and a latch mechanism secured to said cover whereby said inner receptacle can be removed from said outer receptacle upon removal of said cover from said outer receptacle, said mechanism including a rotatable knob on the exterior of said cover and a part depending from said cover and provided with a latch member engageable with said bails.

4. A cooking device comprising an outer receptacle, a cover therefor, a plurality of detachably connected inner receptacles disposed within said outer receptacle, and means for detachably connecting said cover to said inner receptacles whereby said cover may be removed from said outer receptacle with said inner receptacles as a unit.

5. A cooking device comprising an outer receptacle, a cover therefor, a plurality of detachably connected inner receptacles disposed within said outer receptacle, and means for detachably connecting said cover to one of said inner receptacles whereby said cover may be removed from said outer receptacle with said inner receptacles as a unit.

6. A cooking device comprising an outer receptacle, a cover therefor, a plurality of detachably connected inner receptacles disposed within said outer receptacle, means associated with one of said inner receptacles whereby said inner receptacles may be transported from place to place as a unit, and means associated with said cover and detachably connected to said first-named means whereby said inner receptacles may be removed with said cover as a unit from said outer receptacle.

7. A cooking device comprising an outer receptacle, a cover therefor, a plurality of detachably connected inner receptacles disposed within said outer receptacle, means including a bail hinged to one of said inner receptacles whereby said inner receptacles may be transported from place to place as a unit, and means associated with said cover and detachably connected to said bail whereby said inner receptacle may be removed with said cover as a unit from said outer receptacle.

8. A cooking device comprising an outer receptacle, a cover therefor, a plurality of detachably connected inner receptacles disposed within said outer receptacle, means including a bail hinged to one of said inner receptacles whereby said inner receptacles may be transported from place to place as a unit, and a latch mechanism rotatably mounted in said cover and detachably connected to said bail whereby said inner receptacle may be removed with said cover as a unit from said outer receptacle.

9. A cooking device comprising an outer receptacle, a cover therefor, an inner receptacle centrally disposed within said outer receptacle, a plurality of inner receptacles detachably secured to and adjacent said first-named inner receptacle, means associated with said inner receptacle whereby said inner receptacles may be transported from place to place as a unit, and means associated with said cover and detachably connected to said first-named means whereby said inner receptacles may be removed with said cover as a unit from said outer receptacle.

10. A cooking device comprising an outer receptacle, a cover therefor, an inner receptacle centrally disposed within said outer receptacle, a plurality of inner receptacles detachably secured in spaced relation to said first-named inner receptacle and said outer receptacle, means associated with said inner receptacle whereby said inner receptacles may be transported from place to place as a unit, and means associated with said cover and detachably connected to said first-named means whereby said inner receptacles may be removed with said cover as a unit from said outer receptacle.

11. A cooking device comprising an outer receptacle, a cover therefor, an inner receptacle having means associated therewith for transporting the same from place to place, an inner receptacle disposed adjacent said first-named inner receptacle and having an edge overlapping an edge of said first-named inner receptacle whereby the same is detachably connected thereto, and means associated with said cover and detachably connected to said first-named means whereby said inner receptacles may be removed with said cover as a unit from said outer receptacle.

12. A cooking device comprising an outer receptacle, a cover therefor, an inner receptacle having means associated therewith for transporting the same from place to place, an inner receptacle disposed adjacent said first-named inner receptacle and having an edge overlapping an edge of said first-named inner receptacle whereby the same is detachably connected thereto, said overlapping edge of said second-named receptacle being engageable by said first-named means to prevent displacement of said second-named inner receptacle with respect to said first-named inner receptacle, and means associated with said cover and detachably connected to said first-named means whereby said inner receptacles may be removed with said cover as a unit from said outer receptacle.

13. A cooking device comprising an outer receptacle, a cover therefor, an inner receptacle disposed within said outer receptacle and having hinged bails for transporting the same from place to place, a plurality of inner receptacles disposed adjacent said first-named inner receptacle each having an edge overlapping and embracing an edge of said first-named inner receptacle between said bails whereby relative displacement between the same and said first-named inner receptacle is prevented, and a latch mechanism secured to said cover and detachably connected to said bails whereby said cover and said inner receptacles may be removed from said outer receptacle.

14. In a cooking device, the combination of a receptacle, and a receptacle adjacent thereto and having an edge overlapping the edge of said first-named receptacle, one of said receptacles having a laterally extending protuberance engaging the other of said receptacles substantially at a single point to dispose the same in spaced relation thereto.

15. In a cooking device, the combination of a receptacle having hinged bails for transporting the same from place to place, and a receptacle adjacent thereto and having an edge overlapping the edge of said first-named receptacle, said overlapping edge being adapted to be engaged by said bails to prevent displacement of said second-named receptacle with respect to said first-named receptacle, one of said receptacles having a laterally extending protuberance engaging the other of said receptacles substantially at a single point to dispose the same in spaced relation thereto.

16. In a cooking device, the combination of a receptacle having hinged bails for transporting the same from place to place, a plurality of receptacles adjacent thereto, means on said receptacles for detachably securing said plurality of receptacles to said first-named receptacle, said plurality of receptacles being engaged by said bails to prevent relative displacement thereof with respect to said first-named receptacle, each of said plurality of receptacles having a plurality of protuberances engageable with said first-named receptacle at substantially spaced points to dispose the same in spaced relation thereto.

17. In a cooking device, the combination of an outer receptacle, an inner receptacle disposed therein, a second inner receptacle disposed adjacent said first-named inner receptacle and having means for detachably securing the same to said first-named inner receptacle, said second-named inner receptacle being of less depth than said first-named inner receptacle and being spaced from said outer receptacle to provide for free circulation of a cooking medium.

18. In a cooking device, the combination of an outer receptacle, an inner receptacle disposed therein, a second inner receptacle disposed adjacent said first-named inner receptacle and having means for detachably securing the same to said first-named inner receptacle, and means for spacing said receptacles apart to permit free circulation of a cooking medium therebetween, said second-named inner receptacle being of less depth than said first-named inner receptacle and being spaced from said outer receptacle to provide for free circulation of said cooking medium therebetween.

19. In a cooking device, the combination of an outer receptacle, an inner receptacle disposed therein, a second inner receptacle disposed adjacent said first-named inner receptacle and having means for detachably securing the same to said first-named inner receptacle, means on one of said inner receptacles engaging the other for spacing said receptacles apart to permit free circulation of a cooking medium therebetween, said second-named inner receptacle being of less depth than said first-named inner receptacle and being spaced from said outer receptacle to provide for free circulation of said cooking medium therebetween.

20. In a cooking device, the combination of an outer receptacle, a plurality of inner receptacles disposed therein, one of said receptacles being centrally disposed, means for detachably securing said other receptacles to said centrally disposed receptacle, and means between said receptacles for spacing the same to permit free circulation of a cooking medium therebetween, said other receptacles being of less depth than said centrally disposed receptacle and being spaced from said outer receptacle to permit free circulation of said cooking medium therebetween.

21. In a cooking device, the combination of an outer receptacle, an inner receptacle, one or more inner receptacles disposed adjacent thereto, means for detachably connecting said last named one or more receptacles to said first named inner receptacle so that the same can be removed independently therefrom, and means connected to said first named inner receptacle for removing all of said inner receptacles from said outer receptacle simultaneously.

22. In a cooking device, the combination of an outer receptacle, a cover therefor, an inner receptacle, one or more inner receptacles having means for detachably connecting the same to said first named inner receptacle and removable independently therefrom, and means disposable within said outer receptacle when closed by said cover and connected to said first named inner receptacle for removing all of said inner receptacles from said outer receptacle simultaneously.

23. In a cooking device, the combination of an outer receptacle, an inner receptacle, one or more inner receptacles disposed adjacent thereto, means for detachably connecting said last named one or more receptacles to said first named inner receptacle so that the same can be removed independently therefrom, and a bail hinged to said first named inner receptacle for removing all of said inner receptacles from said outer receptacle simultaneously.

24. In a cooking device, the combination of an outer receptacle, an inner receptacle, one or more inner receptacles disposed adjacent thereto, means for detachably connecting said last named one or more receptacles to said first named inner receptacle so that the same can be removed independently therefrom, and bails hinged to said first named inner receptacle and providing means for removing all of said inner receptacles from said outer receptacle simultaneously or said first named inner receptacle independently from said outer receptacle after removal of said last named inner receptacles therefrom.

25. In a cooking device, the combination of an outer receptacle, an inner receptacle, one or more inner receptacles having means for detachably connecting the same to said first named inner receptacle and removable independently therefrom, means for removing said last named inner receptacles, and means connected to said first named inner receptacle for removing all of said inner receptacles from said outer receptacle simultaneously.

26. In a cooking device, the combination of an outer receptacle, an inner receptacle, one or more inner receptacles having means for detachably connecting the same to said first named inner receptacle and removable independently therefrom, means for removing said last named inner receptacles, and means connected to said first named inner receptacle for removing all of said inner receptacles from said outer receptacle simultaneously or said first named inner receptacle independently from said outer receptacle after removal of said last named inner receptacles therefrom.

27. In a cooking device, the combination of an outer receptacle, an inner receptacle, one or more inner receptacles having means for detachably connecting the same to said first named inner receptacle and removable independently therefrom, means for removing said last named inner receptacles, and bails hinged to said first named inner receptacle and forming a common means adapted to be grasped for removing all of said inner receptacles from said outer receptacle simultaneously or said first named inner receptacle independently from said outer receptacle after removal of said last named inner receptacles therefrom.

28. In a cooking device, the combination of an outer receptacle, an inner receptacle, one or more inner receptacles having means for detachably connecting the same to said first named inner receptacle and removable independently therefrom, one or more handles extending upwardly from said last named inner receptacles for removal thereof from said outer receptacle, and bails hinged to said first named inner receptacle and forming a common means adapted to be grasped for removing all of said inner receptacles from said outer receptacle simultaneously or said first named inner receptacle independently from said outer receptacle after removal of said last named inner receptacles therefrom.

29. In a cooking device, the combination of an outer receptacle, a centrally disposed inner receptacle, a plurality of inner receptacles disposed laterally of and having means engaging said centrally disposed inner receptacle at the rim thereof for detachably connecting the same to said centrally disposed inner receptacle and being removable independently therefrom, one or more handles extending upwardly from said last named inner receptacles for removal thereof from said outer receptacle, and bails hinged to said centrally disposed receptacle and forming a common means adapted to be grasped for removing all of said inner receptacles from said outer receptacle simultaneously or said centrally disposed inner receptacle independently from said outer receptacle after removal of said last named inner receptacles therefrom.

ALVA T. SMITH.

DISCLAIMER 2,048,572.—*Alva T. Smith*, Milwaukee, Wis. COOKING DEVICE. Patent dated July 21, 1936. Disclaimer filed September 21, 1938, by the assignee, *National Enameling and Stamping Company*.

Hereby enters this disclaimer to claims 21, 22, 23, 24, 25, 26, 27, 28, and 29 of said patent.

[*Official Gazette October 11, 1938.*]